Figure 1:
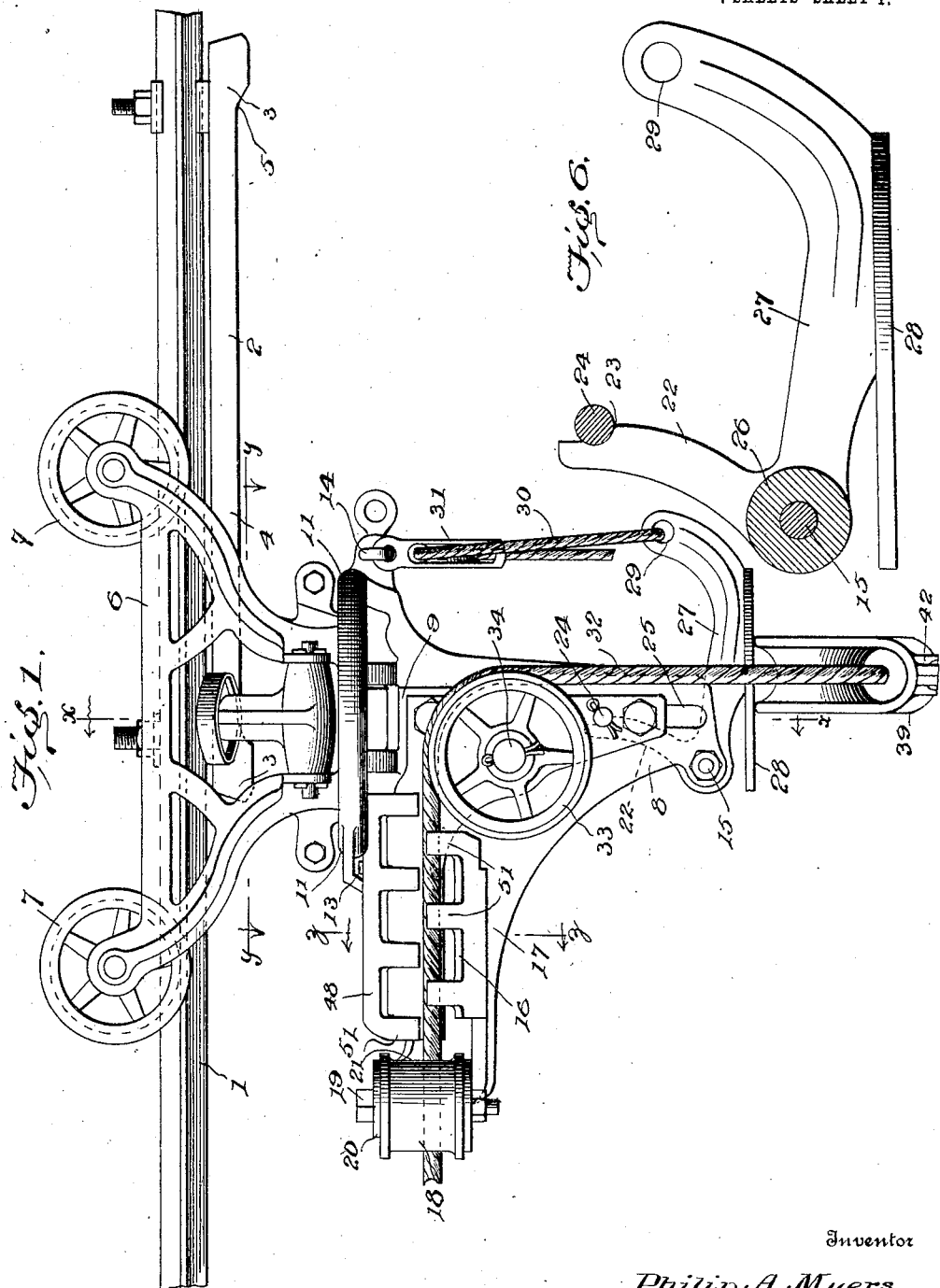

No. 786,455. PATENTED APR. 4, 1905.
P. A. MYERS.
HAY CARRIER.
APPLICATION FILED APR. 7, 1904.

7 SHEETS—SHEET 1.

Witnesses
G. Howard Walmsley
Irvine Miller

Inventor
Philip A. Myers,
By H. A. Toulmin,
Attorney

No. 786,455. PATENTED APR. 4, 1905.
P. A. MYERS.
HAY CARRIER.
APPLICATION FILED APR. 7, 1904.

7 SHEETS—SHEET 3.

Witnesses
E. Howard Walmsley.
Irvine Miller.

Inventor
Philip A. Myers,
By H. A. Toulmin,
Attorney.

No. 786,455. PATENTED APR. 4, 1905.
P. A. MYERS.
HAY CARRIER.
APPLICATION FILED APR. 7, 1904.
7 SHEETS—SHEET 4.
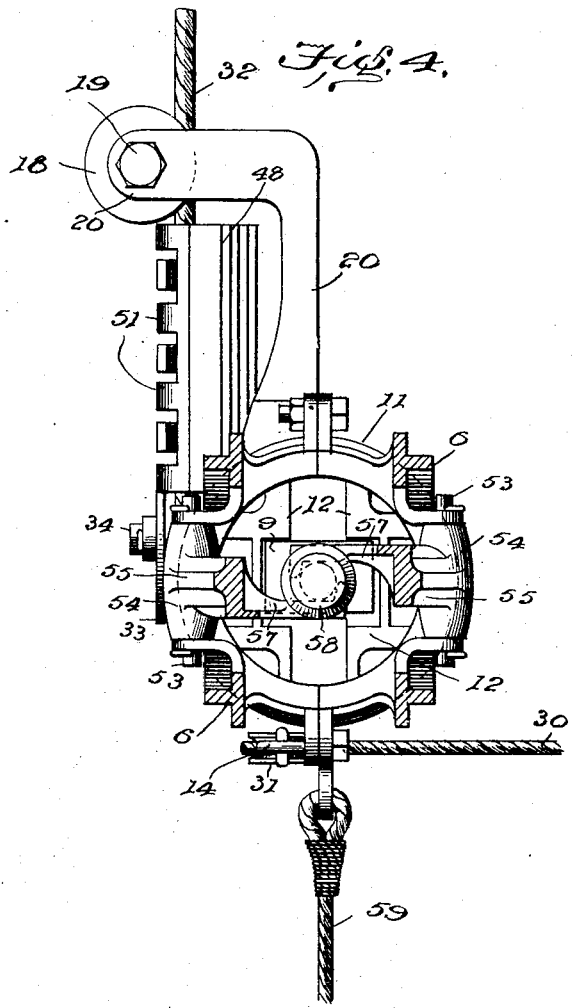
Witnesses
G. Howard Walmsley.
Irvin Miller.
Inventor
Philip A. Myers,
By H. A. Toulmin,
Attorney

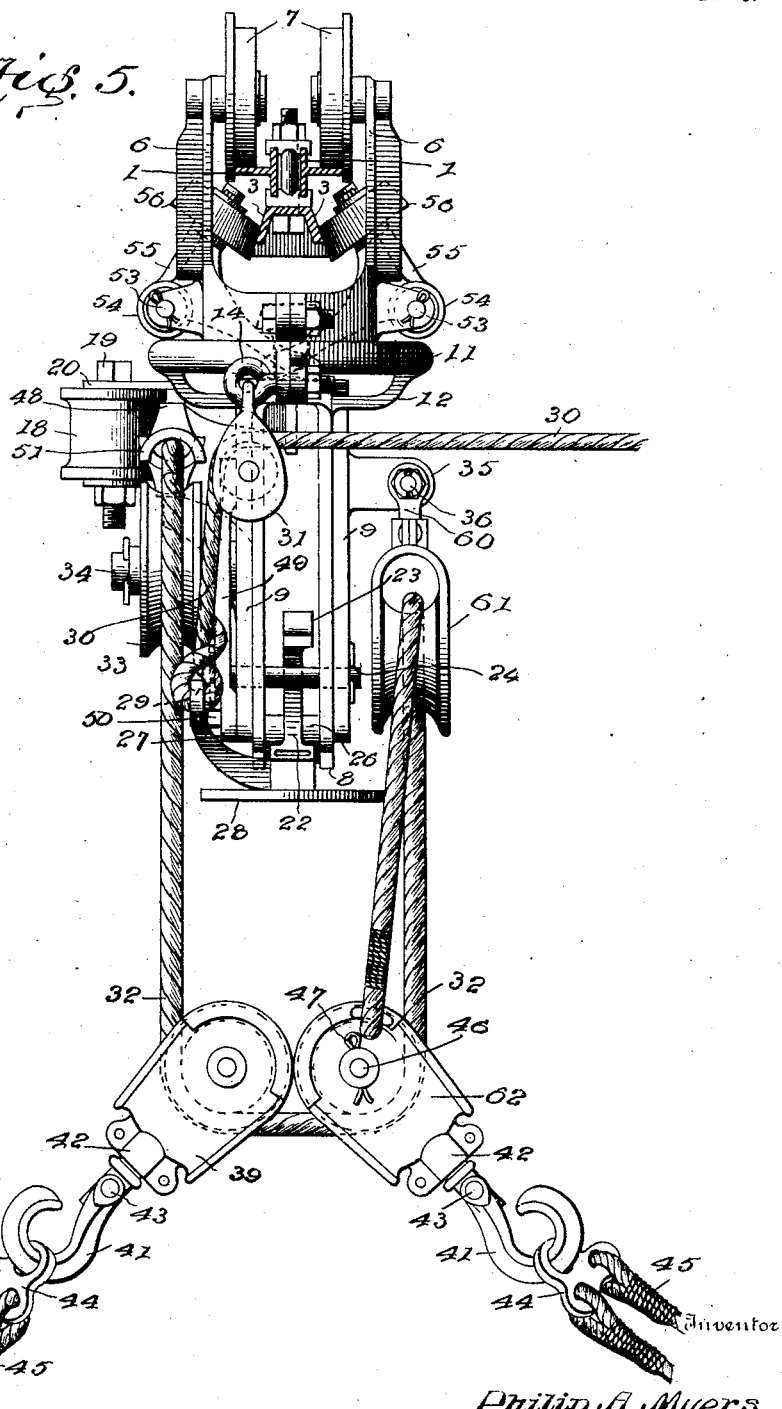

No. 786,455. PATENTED APR. 4, 1905.
P. A. MYERS.
HAY CARRIER.
APPLICATION FILED APR. 7, 1904.
7 SHEETS—SHEET 6.
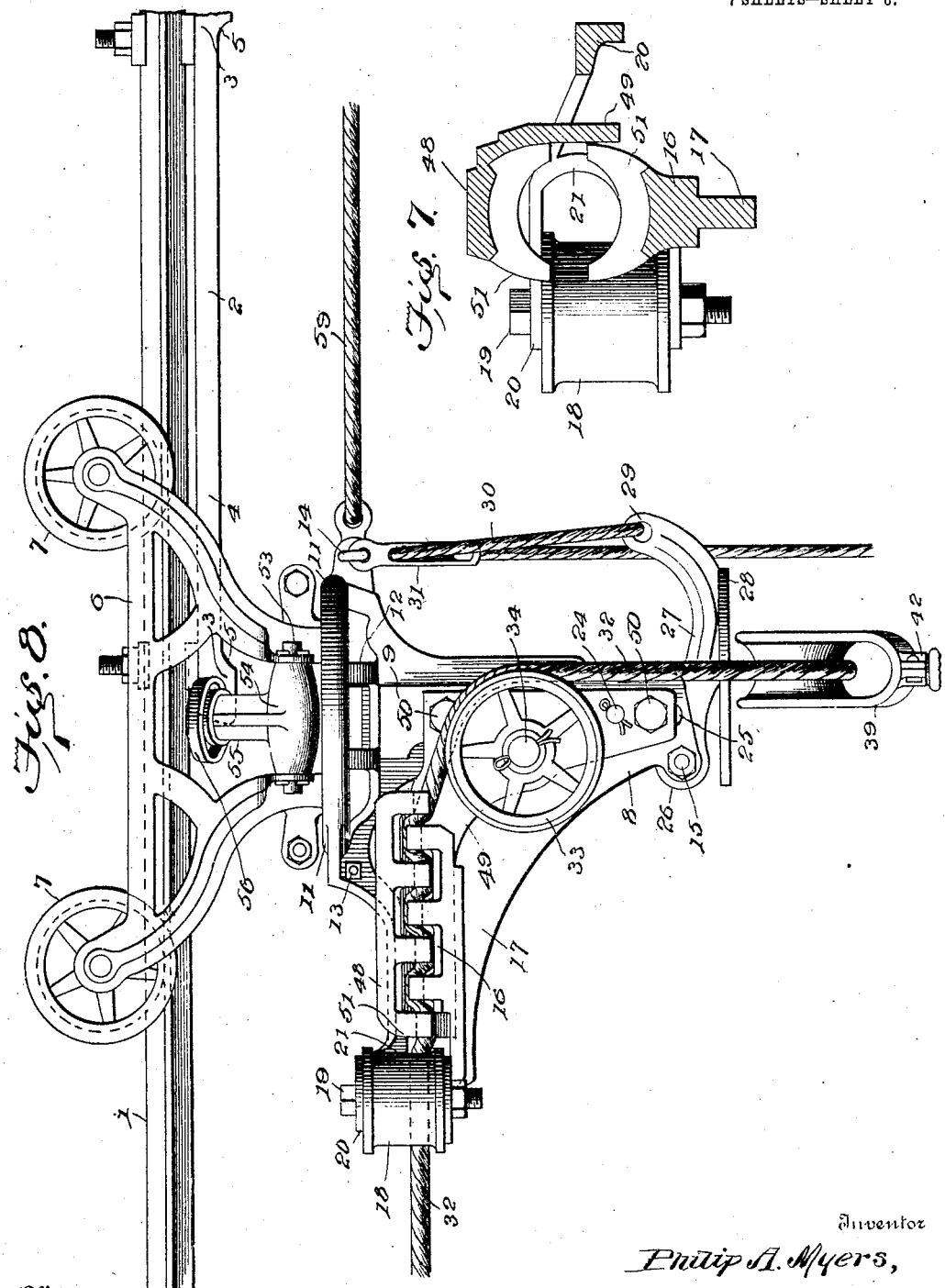
Witnesses
E. Howard Walmsley.
Irene Miller.
Inventor
Philip A. Myers,
By H. A. Toulmin,
Attorney

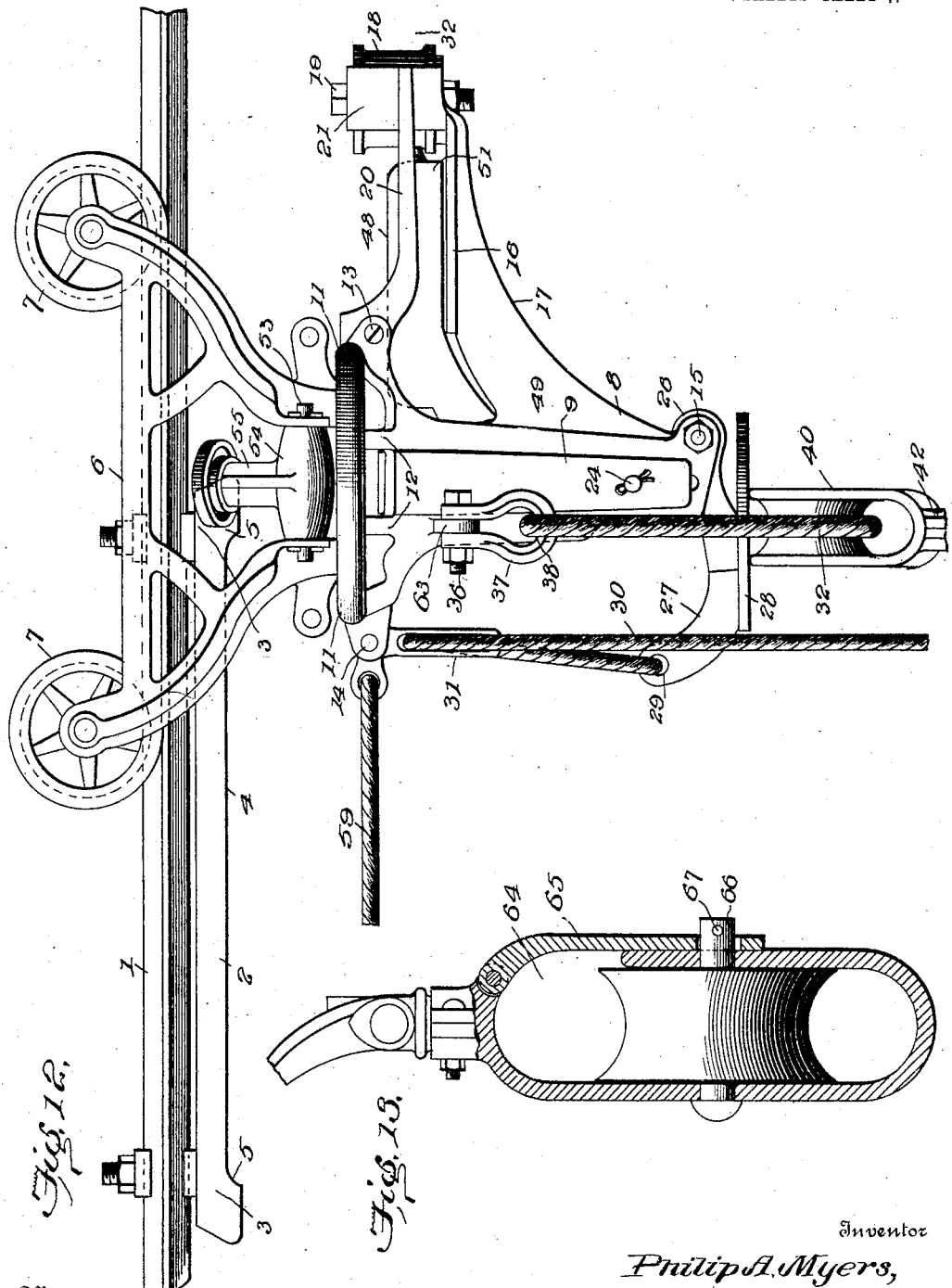

No. 786,455.  
Patented April 4, 1905.

UNITED STATES PATENT OFFICE.

PHILIP A. MYERS, OF ASHLAND, OHIO, ASSIGNOR TO F. E. MYERS & BRO., OF ASHLAND, OHIO, A COPARTNERSHIP.

HAY-CARRIER.

SPECIFICATION forming part of Letters Patent No. 786,455, dated April 4, 1905.

Application filed April 7, 1904. Serial No. 202,005.

*To all whom it may concern:*

Be it known that I, PHILIP A. MYERS, a citizen of the United States, residing at Ashland, in the county of Ashland and State of Ohio, have invented certain new and useful Improvements in Hay-Carriers, of which the following is a specification, reference being had therein to the accompanying drawings.

This invention relates to hay-carriers, and has for its object to provide a simple and efficient device of this character adapted to operate in connection with forks or slings, as may be desired, and readily adapted or changed for use with either one of these devices.

The primary object of the invention is to avoid the complication of structure which renders hay-carriers of this class difficult for the farmer to understand and clumsy to operate.

Among specific objects sought to be obtained by my present invention one of the chief ends is to provide a carrier which shall lift and carry a load or bundle contained in a sling in such a way that the bundle will be lifted, transported, and delivered to the mow in the same position as on the wagon, the bundle being at all times with its axis in a direction longitudinal of the track, the pulley-blocks and their rope lying in a plane transverse to the track.

A further object of the invention is to hold the load or bundle in the position to which it may be raised by means of a rope-lock which firmly grips the rope and which is held in such engagement by the entire weight of the load.

A further object of the invention is to provide a structure of this character which is adapted for use in connection with an additional pulley, whereby the weight of the load may be increased, and whereby the gripping effect of the load upon the rope-lock may be augmented.

To these and other ends my invention consists in certain novel features, which I will now proceed to describe and will then particularly point out in the claims.

Figure 2:
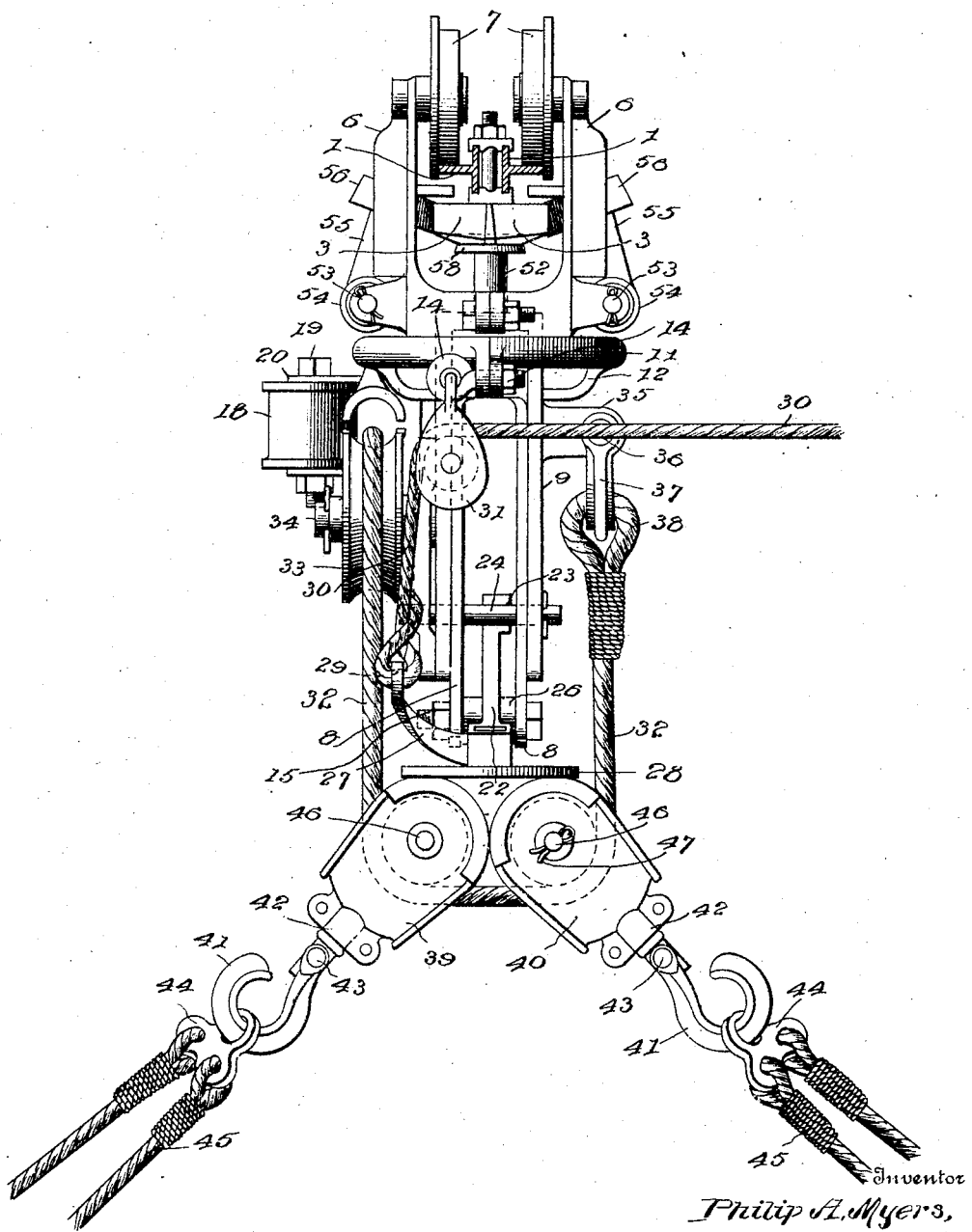
Figure 3:
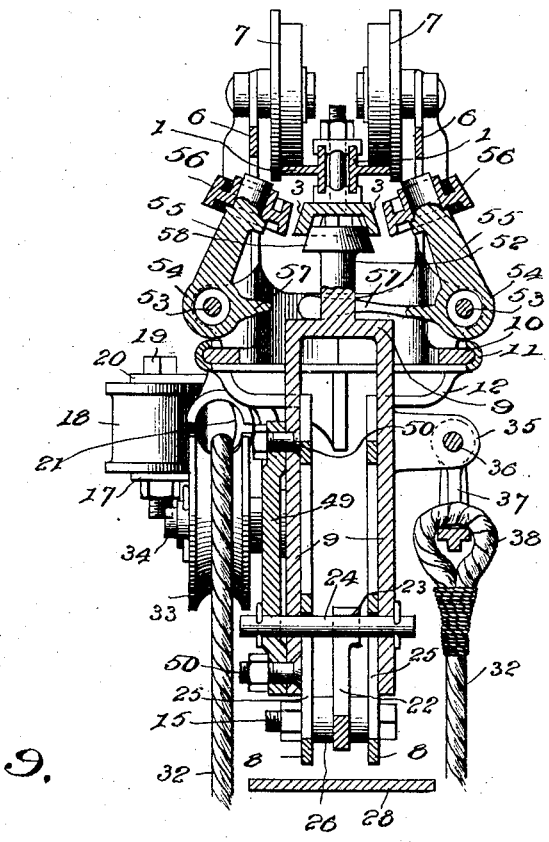
Figure 9:
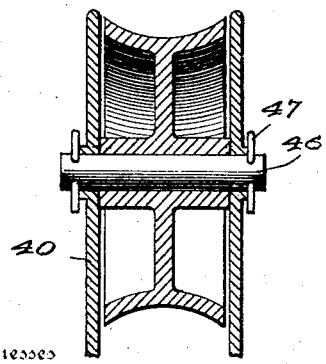
Figure 10:
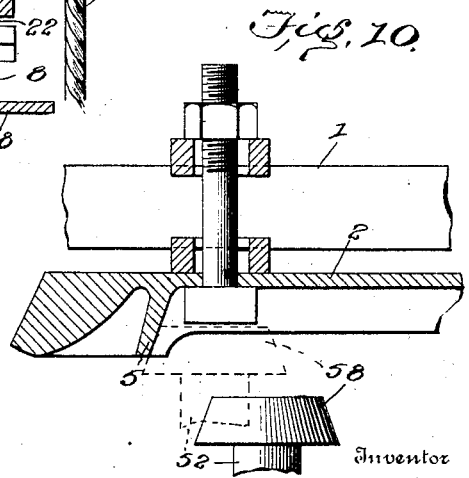

In the accompanying drawings, Figure 1 is a side elevation of a structure embodying my invention in one form. Fig. 2 is an end elevation viewed from the right-hand side of Fig. 1. Fig. 3 is a vertical sectional view taken on the line $x$ $x$ of Fig. 1 and looking in the direction of the arrows. Fig. 4 is a plan section taken on the line $y$ $y$ of Fig. 1 and looking in the direction of the arrows. Fig. 5 is a view similar to Fig. 2, illustrating a modified form of the invention. Fig. 6 is a detail view of the lower part of Fig. 1, partly broken away to illustrate the tripping-dog and its operating parts. Fig. 7 is a detail sectional view through the rope-grip, taken on the line $z$ $z$ of Fig. 1 and looking in the direction of the arrows. Fig. 8 is a view similar to Fig. 1, showing the parts in another position. Fig. 9 is a detail sectional view of one of the blocks. Fig. 10 is a detail vertical sectional view, in a central longitudinal plane, of one end of the knocker, illustrating the coöperation therewith of the stop carried by the carriage. Fig. 11 is a detail view, in front elevation, of the alining-pulley and its supporting-arm. Fig. 12 is a view of the side opposite to that shown in Fig. 1, illustrating a modification; and Fig. 13 is a detail sectional view of a modified form of the block shown in Fig. 9.

In a general way my present invention may be considered as an improvement upon the type of carrier set forth in Letters Patent No. 525,717, granted to me September 11, 1894, in which is disclosed a structure comprising a track, a carriage traveling thereon and supporting a frame to which the hoisting-rope is connected, said hoisting-rope passing over a pulley which is forced against a brake-block by the weight of the load when the tripping-dog is actuated to permit such movement of the pulley, either automatically by the load itself at the upper end of its travel or by hand at any desired point. The pulley is disengaged from the brake-block by means of a knocker on the track, this movement also setting into operative position a stop projection on the carrier, which engages a carriage-stop projection on the knocker to hold the carriage stationary during the hoisting of the load. When the dog is tripped, this carriage-stop is released from engagement with the knocker, and the rope is gripped at the same time by the means provided for that purpose, the rope, which first serves as a hoisting-rope to lift the load, being subsequently used as a traction-rope to draw the carrier along the track to the point of discharge of the load. My present invention involves a structure similar to that just described in that it employs a track, a knocker thereon comprising lifting-cams and a stop, a carriage traveling on the track and supporting a frame to which the hoisting-rope is connected, said frame also having a pulley for the hoisting-rope, a stop projection coöperating with the stop of the knocker, and a tripping-dog operated either automatically by the load or by hand and controlling the gripping devices or rope-lock and the stop, the hoisting-rope being also used as a traction-rope. It differs, however, from my prior construction in material points, which will be hereinafter more specifically set forth.

Referring to the accompanying drawings, in which a construction embodying my invention in one form is shown, 1 indicates a suitable track, which may be of any approved construction. To this track there is secured at a point above the position of the wagon which is to be unloaded a part 2, known as a "knocker" and constituting, in effect, a combined lifting-cam and stop. In the particular form shown, which is adapted for use with a track extending in both directions from the location of the knocker, said knocker is in duplicate, being made of two symmetrical parts oppositely disposed, one part being operative for travel of the carrier in one direction and the other part being operative in connection with the travel of the carrier in the opposite direction. Each part comprises two diverging cam-surfaces 3, which serve to lift the movable frame member hereinafter referred to, two parallel portions 4, which serve to maintain the parts in lifted position, and a stop-shoulder 5, which coöperates with a stop projection on the carrier. On this track there travels a carriage 6, supported on wheels 7, said carriage in turn supporting the frame of the carrier. The frame of the carrier comprises two main portions, one of which (indicated by the reference-numeral 8) I term for purposes of distinction the "fixed" part or member and the other (indicated by the reference-numeral 9) may be termed the "movable" part or member. In the present instance, the type of carrier in which my invention is shown as embodied being what is known as a "swiveling" carrier, the fixed member 8 has a swiveling connection with the carriage 6, the latter being provided with an annular flange or track 10, embraced by a grooved annular flange 11, forming part of the frame member 8, to which it is connected by arms 12. Preferably the fixed member 8 of the frame is divided vertically into two parts connected at the top by bolts 13 and 14 and at the bottom by a bolt 15, so that the annular grooved flange 11 may be readily applied to and removed from the annular track or flange 10.

The fixed frame member 8 carries one of the clamping-jaws of the rope-gripping device constituting the rope-lock. In the present instance this jaw is the fixed jaw and is indicated by the reference-numeral 16, it being located on an arm 17, projecting horizontally from the frame, its extension being normally in a forward direction, by which is meant the direction in which the load moves along the track. For the purposes hereinafter specified the arm 17 is provided at its outer extremity beyond the jaw 16 with an alining or guiding pulley 18, mounted on a vertical axis 19, preferably in the form of a pivot-bolt. From an inspection of Fig. 4 it will be observed that the pulley 18 lies outside of the central line of the gripping-jaws or, in other words, on that side of the line of travel of the rope farthest from the central line of the track. This pulley is additionally supported in position by means of a second arm, 20, which, like the arm 17, is formed on and secured to the fixed frame member 8, extending forward from the same and over the path of the rope, the pulley 18 being removably held between the extremities of the arms 17 and 20 by means of the pivot-bolt 19. A guard-flange 21, located on the other side of the rope, connects the arms 20 and 17 at their outer ends, as indicated in Fig. 11. The tripping-dog (indicated by the reference-numeral 22) is preferably carried by the fixed frame member 8 and engages a part of the movable frame member 9. In the construction shown this dog is mounted upon the pivot-bolt 15, which connects the lower ends of the two parts of the frame member 8. Said dog is provided with a notch or recess 23 in its upper end to engage a pin 24, carried by the movable frame member 9 and passing through vertical slots 25 in the frame member 8. Said tripping-dog is provided with a hub 26, which fits upon the bolt 15 between the two downwardly-extending parts of the frame member 8, and to this hub is connected an arm 27, carrying a contact-plate 28, which lies in the path of the block or blocks to which the load is attached. Said arm 27 is also provided with an eye 29 for the attachment thereto of the tripping-rope 30, which passes through a pulley-block 31, suitably supported on the fixed member 8 of the frame. This connection is preferably effected by forming the rear connecting-bolt 14 at the top of the frame member 8 into an eyebolt, as shown more particularly in Fig. 2.

The movable frame member 9 has a body portion formed in the shape of a bail or yoke, as shown more particularly in section in Fig. 3, the downwardly-extending arms thereof passing downward on the outside of the downwardly-extending parts of the frame member 8, and is guided at its lower end by the pin 24, traveling in the slots 25, and at its upper end by the arms 12, between which it passes. This movable frame member 9 carries the guiding-pulley of the hoisting-rope, the hoisting-rope connection, and the movable jaw of the gripping device, as well as the stop which moves with the carriage. The hoisting-rope is indicated by the reference-numeral 32, and the pulley over which it travels is indicated by the numeral 33, it being mounted on a journal or stud 34, projecting from the frame member 9 at one side thereof. On the opposite side of the frame member 9 there is located a lug 35, so placed as to bring the rear edge of the pulley 33 in the same transverse plane as the axis of the bearing-stud 34 and serving as a point of attachment for the hoisting-rope 32. In the form of construction now under consideration this attachment of the hoisting-rope 32 is a fixed one, the lug 35 receiving a removable bolt 36, which serves to secure a clevis 37, to which the end of the rope 32 is fastened, as indicated at 38. It will thus be seen that the entire weight of the load is supported upon the movable frame member 9 through the medium of its connection with the lug 35 and its passage over the pulley 33. It will also be noticed that these points of support of the hoisting-rope lie on opposite sides of the frame, so that the bight of the rope which receives the block or blocks supporting the load lies in a plane transverse to the carrier and to the track or way on which it is mounted. These blocks are shown in Fig. 2, being indicated by the reference-numerals 39 and 40 and being provided with hooks 41, swiveled to the blocks 42 and jointed or pivoted at 43, so as to readily adapt them to engage the end connections 44 of the sling 45. It will be seen from this construction that the bundle is suspended with its longitudinal axis in the direction of the track, which position it maintains throughout the operation of hoisting, conveying, and delivering. One of the blocks—for instance, the block 40—is made detachable from the body of the rope in any suitable manner—as, for instance, by the provision of a removable journal-pin 46, held in position by cotters 47 or the like, as indicated more particularly in Fig. 9. It will be understood that where the carrier is used in connection with a sling two blocks are employed; but when a fork is used only a single block is required, and I therefore make provision for the ready removal or replacing of one of the blocks to permit the change without requiring the disconnection or "running out" of the hoisting-rope. The movable frame member 9 also carries the movable jaw of the rope-gripping device, (indicated by the reference-numeral 48,) said movable jaw extending over and parallel with the fixed jaw 16. In the present instance I have shown this jaw 48 as formed in a separate piece from the frame member 9, being provided with a downward extension 49, secured to the frame member 9 by means of bolts 50; but this separable construction is not essential and the parts may be made integral.

Considering the two gripping-jaws of the rope locked, it will be observed that while they are capable of movement toward and from each other, one jaw being fixed in the present instance and the other movable, neither of said jaws is capable of movement in the direction of travel of the hoisting-rope. By reason of this construction any tendency to slip on the part of the rope-gripping devices is avoided. Where one of the rope-gripping devices is a part movable in the direction of travel of the rope, as in the case of my prior patent, hereinbefore referred to, where the pulley-wheel itself constitutes one member of the rope-gripping devices, there may be a tendency to slip, which tendency is entirely overcome by my present construction.

The rope-gripping jaws may have any approved form or construction of their gripping-surfaces; but that which I prefer is the construction shown, in which each jaw is provided with a plurality of transverse ribs 51, with intervening grooves or recesses, the ribs of the one jaw lying opposite the grooves or recesses of the other jaw, so that when the rope is gripped between the two jaws it is also deflected in a plurality of short bends, which effectually prevent slipping.

The utility of the alining-pulley 18 will now be apparent, for it will be seen that since the main frame of the carrier is swiveled to the carriage 6, while the pulley 33 is located at one side of the carrier, tension brought upon the lead of the rope 32, extending beyond the alining-pulley, would tend to turn the frame relatively to the carriage if it were not for the presence of the tension-pulley, which being forced against the side of the rope by this turning tendency serves to prevent such turning by the resistance of the very tension which causes it, maintaining the arm 17 in alinement with the track while the carrier is at work. It will be understood, of course, that a flange or projection substituted for the alining-pulley would accomplish the same result, but would not be so desirable, owing to the increased friction caused thereby.

The movable frame member 9 also carries what may be termed the "carriage-stop," which coöperates with the fixed track-stop, constituted in the present instance by the flange or shoulder 5 of the knocker 2. In the present instance this consists of a pin or projection 52, extending upward from the top of the yoke-like body of the movable frame member 9 and so arranged that when the movable frame member 9 is in its upper or raised position said stop will come into contact with the fixed stop 5 and will pass below said fixed stop when the frame member 9 is in its lower or depressed position. The vertical movement by which the frame member 9 is lifted upward is accomplished by the cam or cams with which the knocker 2 is provided, and this may be accomplished in any suitable manner—as, for instance, by means of the construction disclosed in my prior patent, hereinbefore referred to. I prefer, however, to employ a construction which I have devised for the purpose and which is shown in the accompanying drawings. In this construction the carriage 6 is provided on each side with a removable bearing-pin 53, on which is mounted a bell-crank lever 54. Each of these levers has one arm, 55, extended upward and provided with a roll 56, adapted to engage with the cam-inclines 3 and parallel bearing-surfaces 4 of the knocker 2. The other arm, 57, of each bell-crank lever extends horizontally inward and lies in the path of an enlarged head or projection 58, formed upon the stop projection 52. It will be seen that when the frame member 9 is depressed the rolls 56 approach each other and are separated by a distance less than the maximum width of the knocker 2. As the carrier moves along the track where the knocker is located the wedge-like end of the knocker formed by the cam-surfaces 3 enters between the rolls 56 and presses these latter apart, moving the arms 57 upward and causing them to engage the head 58 and move the frame member 9 upward. This upward movement of the frame member 9 continues until the stop 52 is in position to engage the stop 5, which it has just passed, whereupon the tripping-dog 22 falls into position underneath the pin 24, with which it engages, so as to hold the frame member 9 in its lifted position.

The parts being in the position just described, which is shown in Figs. 1, 2, 3, and 4, the operation of unloading proceeds. The usual position of the wagon is underneath the knocker 2 and at right angles to the track 1. Assuming that the device is used in connection with a sling or slings, it will be seen that when the ends of the sling are connected to the blocks 39 and 40 and the free end of the hoisting-rope is drawn out in the usual manner the load is lifted without any change in its position and without any change in the position of the carrier, the hoisting-rope running out freely over the pulley 33 and between the open gripping-jaws 16 and 48, thereby drawing together the ends of the sling to form a bundle and lifting the same to the desired height. This lifting continues until the dog 22 is tripped either by one or both of the blocks coming into contact with the plate 28 when the load is lifted to the maximum height or previously thereto, when the load is lifted to any desired height by pulling on the tripping-rope 30. In either case as soon as the dog is tripped the frame member 9 moves downward under the influence of the weight of the entire load, which is now suspended on said frame member, and the hoisting-rope is immediately gripped between the two jaws of the rope-clamp and is firmly held by the weight of the entire load, which forces the upper movable jaw 48 downward toward the lower fixed jaw 16. At the same time the stop projection 52 falls below the stop 5, and further pulling upon the free end of the hoisting-rope causes the carrier to move along the track 1 toward the point of discharge. This position of the parts is shown in Fig. 12. During this travel of the carrier the bundle or load still remains in its original position with its axis in the line of the track, and it is so delivered at the point of discharge in the mow. In this way the employment of separate devices for giving the load a quarter-turn is entirely dispensed with, the carrier being thereby simplified, lightened, and rendered less expensive. After the load is discharged the carrier is returned in the usual manner by a return-rope 59, connected to that side of the frame opposite to that on which the arms 17 and 20 are located, and when the carrier again reaches the knocker the parts are reset in the manner already described, and another load may then be hoisted and conveyed to its destination. The trip-rope may be used to return the carrier.

It will be observed that the rope-lock is free from slip, the rope being firmly gripped between the stationary devices on both sides. It will also be observed that these gripping devices are so located and arranged that they are adapted for use in connection with a swiveling carrier, being equally efficient in whichever direction the frame is turned relative to the carriage. Furthermore, the rope-lock is practically absolutely secure, owing to the fact that the entire weight of the load is employed to actuate it, so that additional load always means additional gripping power for the lock. It will also be noted that the carrier may be readily changed to adapt it for use either with a sling or with a fork.

Under certain conditions wherever large and heavy loads are handled what is known as a "triple-rope" arrangement is employed, in which the carrier end of the hoisting-rope instead of being fastened directly to the carrier passes over a block or pulley on the carrier and is extended down and fastened to one of the sling-blocks. Such an arrangement is shown in Fig. 5 of the drawings, in which the clevis 37 is removed and a clevis 60 substituted, which supports a block 61, around which the hoisting-rope 32 is passed, said rope being extended down and connected to one of the sling-blocks 62. Where this construction is employed, it will be seen that the efficiency of the hoisting power is increased, so as to enable it to handle a larger load, and it will also be observed that with this construction the efficiency of the gripping action of the rope-lock is correspondingly augmented, since the ratio of the weight of the load upon the frame and movable jaw of the gripping device to the pull is multiplied by the employment of the interposed pulley or block 60.

While I have illustrated a structure embodying with modifications my invention in a form which I deem preferable, I do not wish to be understood as limiting myself to the particular details of construction hereinbefore described and shown in the accompanying drawings nor to the particular embodiment of my invention chosen for purposes of illustration, as it is obvious that the invention is capable of other embodiments, that the details of construction may be varied, and that a structure does not require the embodiment therein of all of the features hereinbefore set forth, and defined in the appended claims, in order to come within the scope of my invention. For instance, although I prefer the construction hereinbefore described, in which the entire weight of the load operates directly to grip the rope between the clamping-jaws, such result being attained in the construction shown by locating both of the hoisting-rope connections upon the movable frame member which carries the movable jaw, nevertheless the advantage of my invention in this respect may be obtained in a less degree by utilizing only a portion of the weight of the load to grip the rope, and this may be readily accomplished by mounting one of the hoisting-rope connections on the fixed part of the frame. Such a construction is shown in Fig. 12, in which the lug 63, which takes the place of the lug 35 as a means of connection or attachment for the end of the hoisting-rope or of the block 61, is mounted upon the fixed member 8 of the frame instead of on the movable member 9. Where this construction is employed, that portion of the weight of the load which is supported from the pulley 33 still serves to operate the rope-lock in the manner already described. Furthermore, although I have shown the gripping-jaws so constructed that one jaw is fixed and the other movable my invention is obviously not limited to this particular form of construction, since either or both of the jaws may be movable, and their movement is not necessarily effected by a direct connection with the moving part or parts of the frame, but may be effected by intermediate mechanism for transmitting the motion to the jaw or jaws. It will also be obvious that the particular rope-lock set forth and claimed herein may be used in connection with carriers which do not embody all of the novel features hereinbefore described—as, for instance, the arrangement of the hoisting-rope and its supports in a plane transverse to the line of travel of the carrier—nor is the application of this rope-lock restricted to the swiveling type of carrier chosen for purposes of illustration.

In Fig. 13 I have shown a modified form of sling-block adapted to be readily removed from the bight or loop of the hoisting-rope in case it is to be used with a fork. This sling-block may be employed in place of the block shown in detail in Fig. 9 and is a well-known type of a snatch-block, having an opening 64 in its side through which the rope may be removed from the block, said opening being normally closed by a pivoted latch 65, which fits over the journal-pin 66 of the pulley-wheel and is held in place by a cutter 67.

Having thus fully described my invention, what I claim as new, and desire to secure by Letters Patent, is—

1. A hay-carrier comprising a frame having a fixed member and a movable member, a hoisting-rope pulley and a hoisting-rope connection mounted on opposite sides of the movable member in a plane transverse to the line of travel of the carrier, means for lifting the movable member, a dog for supporting said movable member in lifted position, means for tripping the dog, and a rope-lock independent of the pulley and located in front of the same, said rope-lock being actuated by the movable member to grip the hoisting-rope in front of the pulley when the dog is tripped, substantially as described.

2. A hay-carrier comprising a carriage, and a frame swiveled thereto, said frame having a hoisting-rope pulley and a hoisting-rope connection located on opposite sides thereof in a plane transverse to the line of travel of the carrier, and an alining pulley supported by said frame in front of the hoisting-rope pulley, and arranged to bear upon the side of the hoisting-rope to prevent the frame from rotating relatively to the carriage, substantially as described.

3. A hay-carrier comprising a carriage, and a frame swiveled thereto and having a fixed member and a movable member, a hoisting-rope pulley and a hoisting-rope connection mounted on opposite sides of the movable member in a plane transverse to the line of travel of the carrier, means for lifting the movable member, a dog for supporting said movable member in lifted position, means for tripping the dog, a rope-lock located in front of the hoisting-rope pulley and actuated by the movable member to grip the hoisting-rope when the dog is tripped, and an alining pulley supported by said frame in front of the rope-lock and arranged to bear against the side of the rope during the hoisting of the load to prevent the frame from rotating relatively to the carriage, substantially as described.

4. A hay-carrier comprising a carriage, and a frame swiveled thereto, said frame having a hoisting-rope pulley and a hoisting-rope connection located on opposite sides thereof in a plane transverse to the line of travel of the carrier, and an alining device supported by said frame in front of the hoisting-rope pulley, and arranged to bear upon the side of the hoisting-rope to prevent the frame from rotating relatively to the carriage, substantially as described.

5. A hay-carrier comprising a carriage, and a frame swiveled thereto, said frame having a fixed member and a movable member, a hoisting-rope pulley and a hoisting-rope connection supported on opposite sides of said movable member, means for lifting the movable member, a dog for supporting said movable member in lifted position, means for tripping the dog, a combined hoisting and traction rope supported by said pulley and connection with its bight in a plane transverse to the line of travel of the carrier and its lead extending in the direction of said line of travel, and a rope-lock actuated by the weight of the load upon the movable member to grip the hoisting-rope when the dog is tripped, substantially as described.

6. A hay-carrier comprising a carriage, and a frame swiveled thereto, said frame having a fixed member and a movable member, a hoisting-rope pulley and a hoisting-rope connection supported on opposite sides of said movable member, means for lifting the movable member, a dog for supporting said movable member in lifted position, means for tripping the dog, a combined hoisting and traction rope supported by said pulley and connection with its bight in a plane transverse to the line of travel of the carrier and its lead extending in the direction of said line of travel, and a rope-lock independent of the pulley and actuated by the weight of the load upon the movable member to grip the hoisting-rope when the dog is tripped, substantially as described.

7. A hay-carrier comprising a carriage, and a frame swiveled thereto, said frame having a fixed member and a movable member, a hoisting-rope pulley and a hoisting-rope connection supported on opposite sides of said movable member, said fixed and movable members being respectively provided with gripping-jaws, means for lifting the movable member, a dog for supporting said movable member in lifted position, means for tripping said dog, and a combined hoisting and traction rope supported from the movable member by said pulley and connection with its bight in a plane transverse to the line of travel of the carrier and its lead extending between the gripping-jaws in the direction of said line of travel, whereby the entire weight of the load supported from opposite sides of the movable member acts to force its gripping-jaw toward the gripping-jaw of the fixed member when the dog is tripped, substantially as described.

8. A hay-carrier comprising a carriage, and a frame swiveled thereto, said frame having a fixed member and a movable member, a hoisting-rope pulley and a hoisting-rope connection supported on opposite sides of said movable member, said fixed and movable members being respectively provided with gripping-jaws mounted in fixed relation to said members, means for lifting the movable member, a dog for supporting said movable member in lifted position, means for tripping said dog, and a combined hoisting and traction rope supported from the movable member by said pulley and connection with its bight in a plane transverse to the line of travel of the carrier and its lead extending between the gripping-jaws in the direction of said line of travel, whereby the entire weight of the load supported from opposite sides of the movable member acts to force its gripping-jaw toward the gripping-jaw of the fixed member when the dog is tripped, substantially as described.

9. A hay-carrier comprising a load-supporting frame having a fixed member and a movable member, the fixed member being provided with a forwardly-extending arm having a rope-gripping jaw and an alining pulley, the movable member being provided with a hoisting-rope pulley and a hoisting-rope connection, mounted on opposite sides thereof in a plane transverse to the line of travel of the carrier, and having a gripping-jaw located above the gripping-jaw of the fixed member, means for lifting, supporting and tripping the movable member, and a carriage having a swiveling connection with said load-supporting frame, substantially as described.

10. In a hay-carrier, the combination, with a track having a knocker provided with diverging cam-surfaces, of a carriage adapted to travel on said track, a load-supporting frame having a fixed member and a vertically-movable member, the latter provided with a pulley over which the hoisting-rope passes, a rope-lock independent of the hoisting-rope pulley and actuated by the movable member of the frame, and lifting-levers mounted on the carriage, each lever having one arm provided with a roller to coöperate with a cam-surface of the knocker, and another arm engaging the movable frame member, substantially as described.

11. In a hay-carrier, the combination, with a track provided with a knocker having diverging cam-surfaces, of a carriage adapted to travel on said track, a load-supporting frame having a swiveled connection with said carriage and comprising a fixed member and a vertically-movable member, said movable member having mounted thereon a pulley over which the hoisting-rope passes, a rope-lock independent of said pulley and operated by the movable member, said movable member having an upwardly-extending projection with a terminal head, and lifting-levers mounted on opposite sides of the carriage, each lever having one arm provided with a roller to engage a cam-incline of the knocker, and the other arm extending under the head of the projection on the movable frame member, substantially as described.

12. A hay-carrier comprising a frame having the hoisting-rope pulleys mounted on opposite sides thereof in a plane transverse to the line of travel of the carrier, and a hoisting-rope passing over said pulleys and provided with sling-blocks, one end of said hoisting-rope being connected to one of the sling-blocks, substantially as described.

13. A hay-carrier comprising a frame provided with a rope-lock consisting of gripping-jaws, said frame having hoisting-rope connections mounted on opposite sides thereof in a plane transverse to the line of travel of the carrier, said connections consisting of pulleys, and a hoisting-rope passing over said pulleys, provided with sling-blocks, and having one of its ends connected to one of the sling-blocks, the weight of the load carried by said hoisting-rope actuating the rope-lock to grip said hoisting-rope, substantially as described.

In testimony whereof I affix my signature in presence of two witnesses.

PHILIP A. MYERS.

Witnesses:
R. McD. TUBBS,
F. B. KELLOGG.